US011821284B2

(12) United States Patent
Urdaneta et al.

(10) Patent No.: US 11,821,284 B2
(45) Date of Patent: Nov. 21, 2023

(54) AUTOMATED CEMENTING METHOD AND SYSTEM

(71) Applicant: Schlumberger Technology Corporation, Sugar Land, TX (US)

(72) Inventors: Carlos Urdaneta, Houston, TX (US); Rajnarayanan Balsamy, Sugar Land, TX (US); Quy Nguyen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1215 days.

(21) Appl. No.: 16/415,329

(22) Filed: May 17, 2019

(65) Prior Publication Data

US 2020/0362664 A1    Nov. 19, 2020

(51) Int. Cl.
| | | |
|---|---|---|
| *E21B 33/14* | (2006.01) | |
| *G05B 19/05* | (2006.01) | |
| *E21B 47/005* | (2012.01) | |
| *B01F 101/49* | (2022.01) | |

(52) U.S. Cl.
CPC ............ *E21B 33/14* (2013.01); *E21B 47/005* (2020.05); *G05B 19/05* (2013.01); *B01F 2101/49* (2022.01)

(58) Field of Classification Search
CPC .............................. E21B 33/14; E21B 47/005
USPC ............................................................ 702/9
See application file for complete search history.

(56) References Cited

U.S. PATENT DOCUMENTS

| | | | | |
|---|---|---|---|---|
| 4,226,542 A | * | 10/1980 | Black ...................... | B03B 9/063 |
| | | | | 366/8 |
| 4,571,993 A | | 2/1986 | St. Onge | |
| 5,027,267 A | * | 6/1991 | Pitts .................... | B01F 35/2134 |
| | | | | 700/285 |

(Continued)

FOREIGN PATENT DOCUMENTS

| | | |
|---|---|---|
| WO | 2016085483 A1 | 6/2016 |
| WO | 2017023319 A1 | 2/2017 |

(Continued)

OTHER PUBLICATIONS

P.M.J. Tardy, S.H. Bittleston, A model for annular displacements of wellbore completion fluids involving casing movement, Journal of Petroleum Science and Engineering, vol. 126, Feb. 2015, pp. 105-123.

(Continued)

*Primary Examiner* — Lina Cordero
(74) *Attorney, Agent, or Firm* — Jeffrey D. Frantz

(57) ABSTRACT

A method may include obtaining, by a computer processor, a request to initiate a cementing procedure. The method may further include determining, by the computer processor, an automated sequence for the cementing procedure. The method may further include transmitting, by the computer processor and based on the automated sequence, a cementing management command that triggers the cementing procedure for cementing equipment in a cementing system. The method may further include obtaining, by the computer processor, sensor data regarding the cementing equipment. The method may further include determining, by the computer processor and in response to the sensor data, whether to perform a next procedure in the automated sequence.

17 Claims, 8 Drawing Sheets

(56) References Cited

U.S. PATENT DOCUMENTS

| | | | |
|---|---|---|---|
| 5,320,425 A | 6/1994 | Stephenson et al. | |
| 5,355,951 A | 10/1994 | Allen et al. | |
| 5,455,780 A | 10/1995 | Nguyen et al. | |
| 5,775,803 A | 7/1998 | Montgomery et al. | |
| 6,125,935 A | 10/2000 | Shahin, Jr. | |
| 6,296,057 B2 | 10/2001 | Thiercelin | |
| 6,697,738 B2 | 2/2004 | Ravi et al. | |
| 6,749,330 B2 | 6/2004 | Allen | |
| 6,826,492 B2 | 11/2004 | Newman | |
| 6,922,637 B2 | 7/2005 | Ravi et al. | |
| 7,133,778 B2 | 11/2006 | Ravi et al. | |
| 7,860,593 B2 | 12/2010 | Boone | |
| 8,386,059 B2 | 2/2013 | Boone | |
| 8,392,158 B2 | 3/2013 | James | |
| 8,505,625 B2 | 8/2013 | Ravi et al. | |
| 8,636,063 B2 | 1/2014 | Ravi et al. | |
| 8,718,802 B2 | 5/2014 | Boone | |
| 10,301,922 B2 | 5/2019 | Abbassian et al. | |
| 2003/0072208 A1* | 4/2003 | Rondeau | B01F 35/2132 366/136 |
| 2014/0309936 A1 | 10/2014 | Abbassian et al. | |
| 2015/0315898 A1 | 11/2015 | Marland et al. | |
| 2015/0322775 A1 | 11/2015 | Marland et al. | |
| 2016/0032706 A1 | 2/2016 | Bomnaz et al. | |
| 2017/0002622 A1 | 1/2017 | De Bruijn et al. | |
| 2017/0096874 A1 | 4/2017 | Parsons et al. | |
| 2017/0122092 A1* | 5/2017 | Harmer | E21B 44/06 |
| 2017/0364607 A1 | 12/2017 | Kaushik et al. | |
| 2018/0073352 A1 | 3/2018 | Potapenko et al. | |
| 2018/0142544 A1 | 5/2018 | Kolchanov et al. | |
| 2018/0363414 A1 | 12/2018 | Bogaerts et al. | |

FOREIGN PATENT DOCUMENTS

| | | |
|---|---|---|
| WO | 2017039649 A1 | 3/2017 |
| WO | 2018033234 A1 | 2/2018 |

OTHER PUBLICATIONS

Purvis et al., "Eliminating the Unknowns of Primary Cementing With On-Site Verification and Post-Job Analysis", SPE 23991, Society of Petroleum Engineers, pp. 463-472, 1992.

Purvis et al., "Real-Time Monitoring Provides Insight Into Flow Dynamics During Foam Cementing", SPE 24570, SPE Drilling & Completion, pp. 124-132, Jun. 1994.

Creel et al., "Real-Time Cementing Designs vs. Actual Jobs in Progress", IADC/SPE 98079, IADC/SPE Drilling Conference, 2006, 13 pages.

Shine et al., "Accounting for Lost Circulation and NAF Compressibility—Impacts on Cement Placement", SPE 163446, SPE/IADC Drilling Conference and Exhibition, 2013, 11 pages.

* cited by examiner

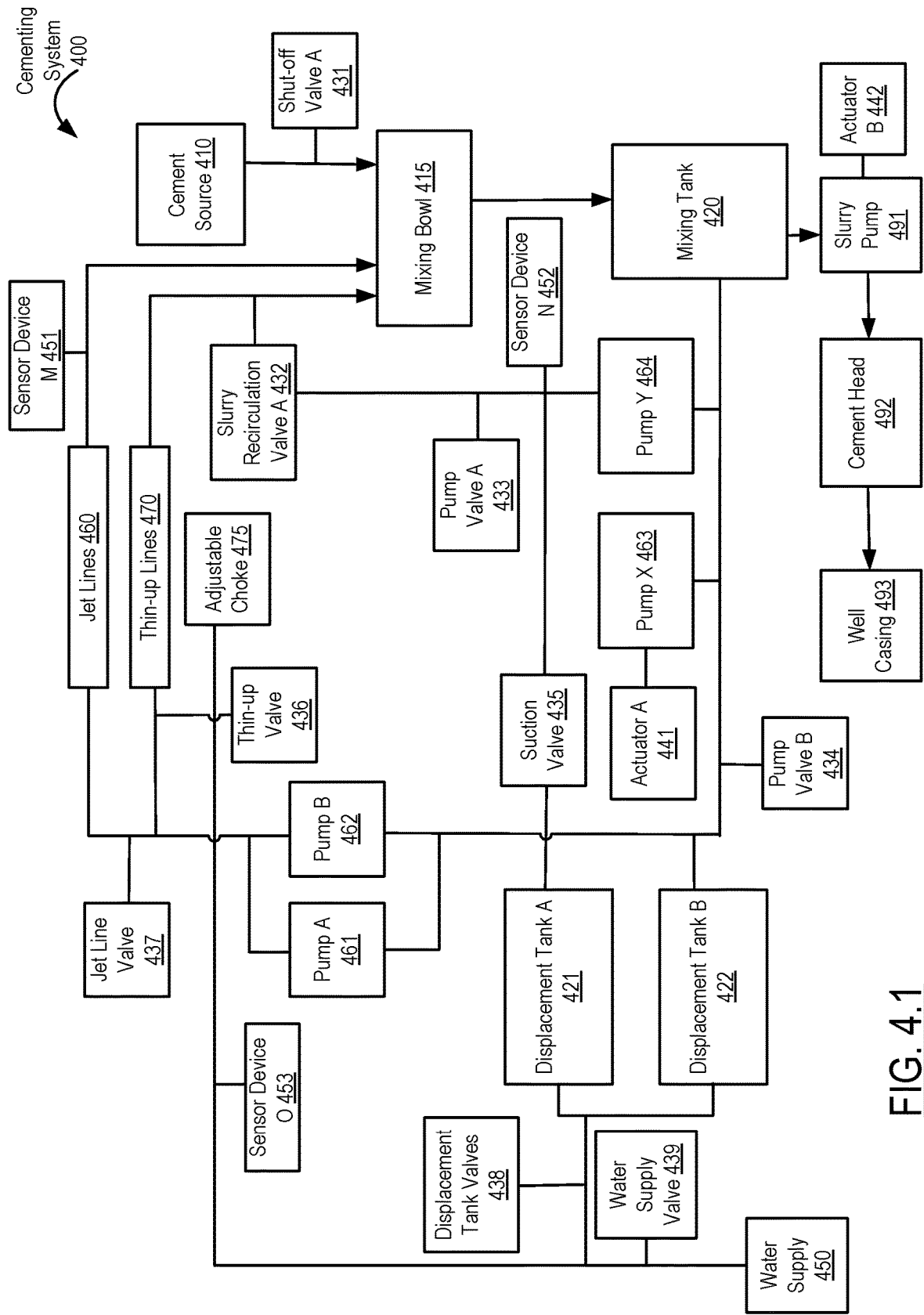
FIG. 4.1

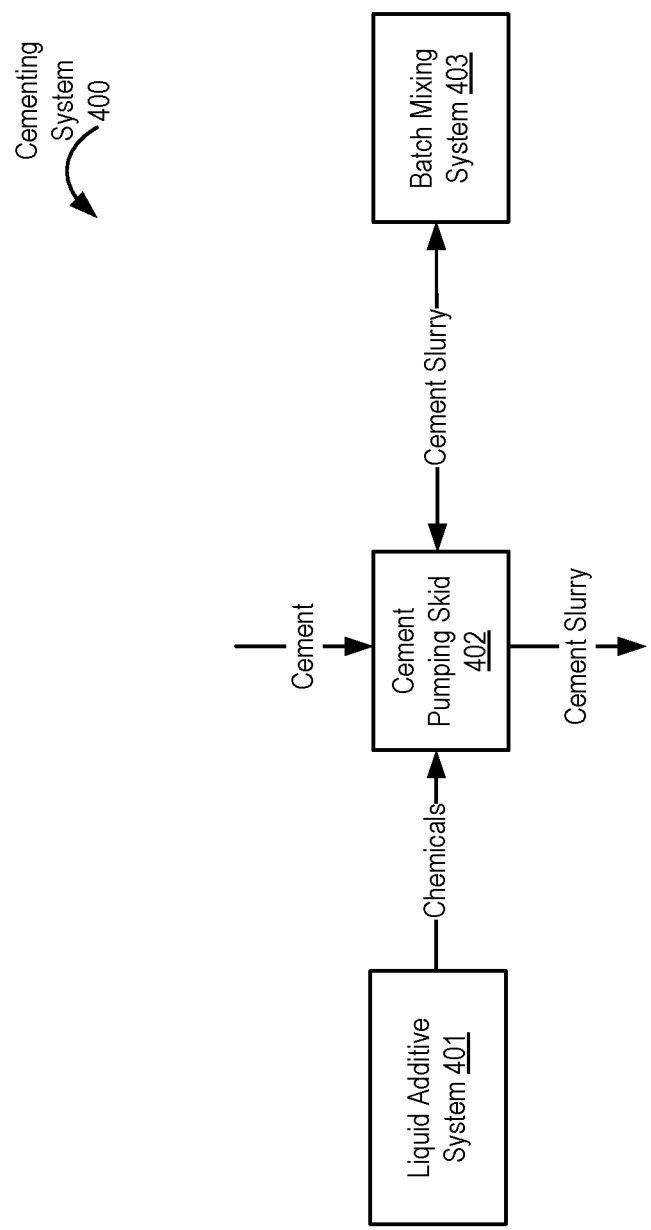
FIG. 4.2

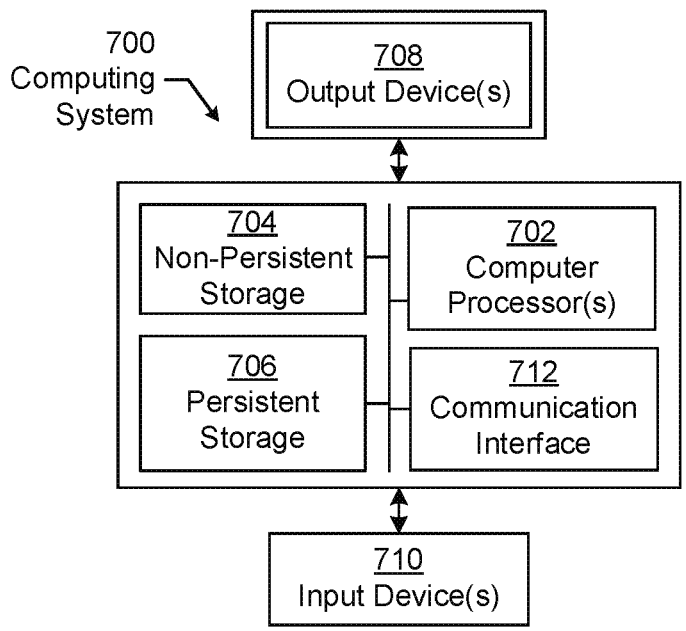
*FIG. 7.1*
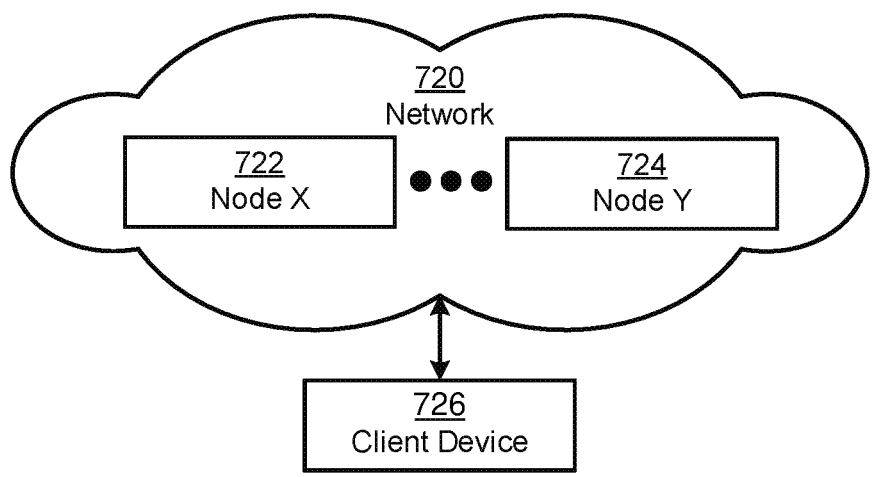
*FIG. 7.2*

AUTOMATED CEMENTING METHOD AND SYSTEM

BACKGROUND

Well cementing is the process of placing cement slurry in a well to achieve several objectives, including cementing the casing strings and liners, placing cement plugs, and performing remedial cement procedures. The cementing process may involve mixing cement slurry composed of dry powdered cement, water, and chemical additives that are used to control various cement properties. Specialized equipment is used to mix the cement slurry to a predetermined slurry density measured in mass per volume units. The cement slurry may then be pumped downhole into the well using high-pressure pumps.

SUMMARY

In general, in one aspect, the disclosed technology relates to a method. The method includes obtaining, by a computer processor, a request to initiate a pre-operation cementing procedure. The method further includes determining, by the computer processor, an automated sequence for the pre-operation cementing procedure. The automated sequence corresponds to various priming procedures for a cementing system. The method further includes transmitting, by the computer processor and based on the automated sequence, a cementing management command that triggers a priming procedure among the priming procedures for cementing equipment in the cementing system. The method further includes obtaining, by the computer processor, sensor data regarding the cementing equipment. The method further includes determining, by the computer processor and in response to the sensor data, whether to perform a next priming procedure in the automated sequence.

In general, in one aspect, the disclosed technology relates to a method. The method includes obtaining, by a computer processor, a request to initiate a post-operation cementing procedure. The method further includes determining, by the computer processor, an automated sequence for the post-operation cementing procedure. The automated sequence corresponds to various washing procedures for a cementing system. The method further includes transmitting, by the computer processor and based on the automated sequence, a cementing management command that triggers a washing procedure among the washing procedures for cementing equipment in the cementing system. The method further includes obtaining, by the computer processor, sensor data regarding the cementing equipment in the cementing system. The method further includes determining, by the computer processor and in response to the sensor data, whether to perform a next washing procedure in the automated sequence.

In general, in one aspect, the disclosed technology relates to a system. The system includes a drilling management network and a cementing system coupled to the drilling management network. The cementing system further includes a sensor device. The cementing system pumps cement slurry into a wellbore. The system further includes a cementing system manager coupled to the cementing system. The cementing system manager includes a computer processor. The cementing system manager determines an automated sequence for various cementing procedures. The cementing system manager further transmits, based on the automated sequence, a cementing management command that triggers a cementing procedure for cementing equipment in the cementing system. The cementing system manager further obtains, from the sensor device, sensor data regarding the cementing equipment. The cementing system manager further determines, in response to the sensor data, whether to perform a next cementing procedure in the automated sequence.

Other aspects of the disclosure will be apparent from the following description and the appended claims.

BRIEF DESCRIPTION OF DRAWINGS

FIGS. 1, 2, 3, 4.1, and 4.2 show systems in accordance with one or more embodiments.

DETAILED DESCRIPTION

Figure 1:
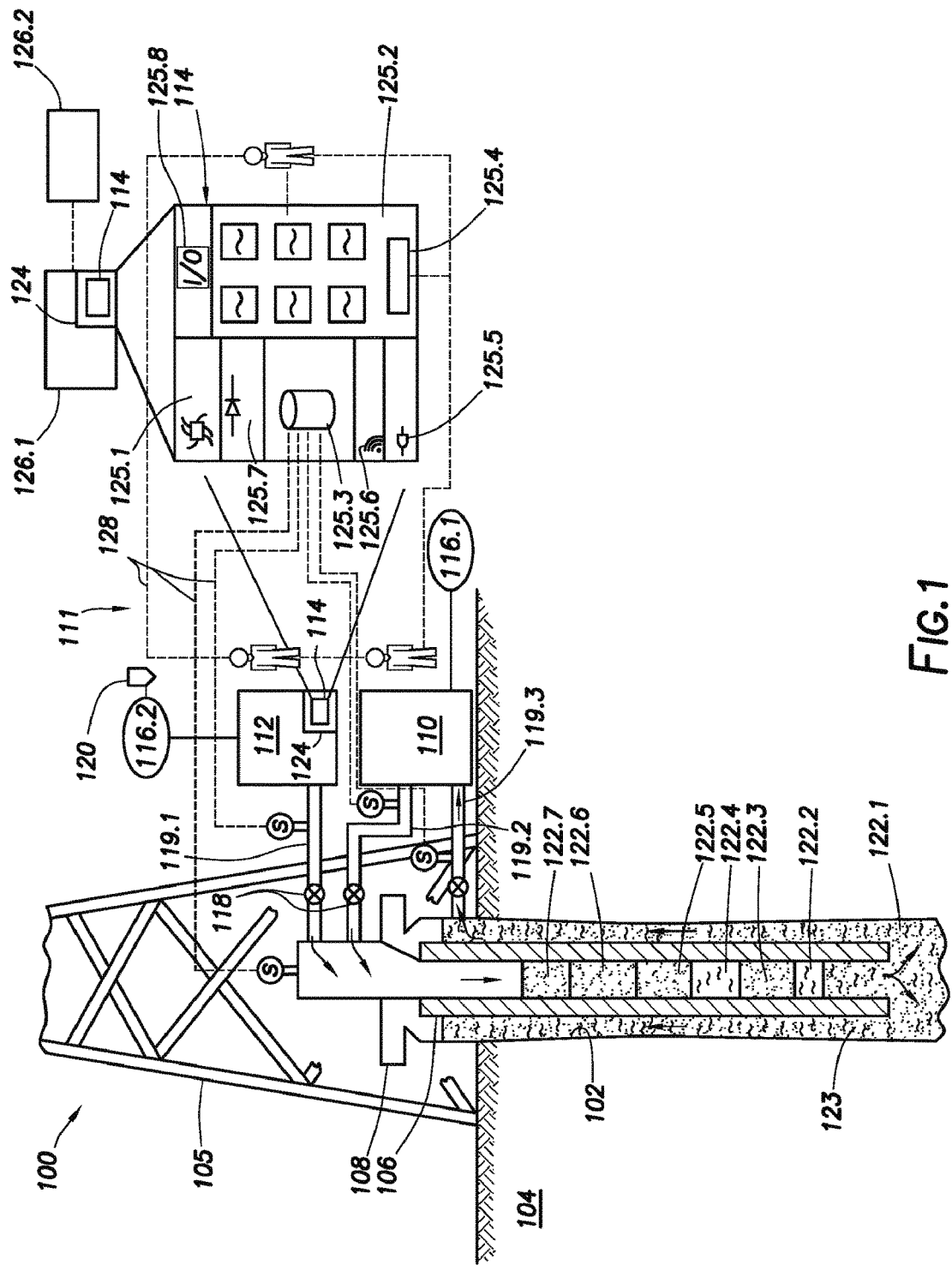

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and various methods for automating a cementing system coupled to a drilling rig and/or drilling management network. Specifically, a cementing system and/or drilling management network may manage an automated process performed prior to or after a cementing procedure for sealing a wellbore. The automated sequence may include multiple procedures or routines that may need to be performed sequentially and/or in parallel to perform the automated sequence. For example, a user device may trigger a request to perform an automated sequence for priming pumps and/or other cementing equipment for a cementing procedure. Likewise, another automated sequence may correspond to a washing procedure following a cementing operation for a wellbore. Once a user initiates the particular automated sequence, the cementing system may run the automated sequence to completion without further human intervention. For example, a user may push a single button on a user device which consequently triggers a priming or washup sequence automatically.

In some embodiments, for example, a cementing system manager may collect sensor data from sensor devices throughout the cementing system and/or drilling management network to verify the status of one or more cementing procedures in the automated sequence. The cementing system manager may be one or more programmable logic controllers (PLCs) that include functionality for controlling and/or automating procedures performed using cementing equipment. For example, the cementing system manager may obtain sensor data to identify whether a particular procedure is being performed by cementing equipment within predetermined parameters and/or to completion. Once the cementing system manager detects one procedure is finished in an automated sequence, the cementing system manager may transmit one or more commands to cementing equipment and/or other components in a drilling management network to begin the next procedure in the automated sequence.

In some embodiments, a cementing system manager may be capable of sensing operational parameters and performing an automated sequence without a request triggered by a human operator. The cementing system manager may be made autonomous through acquisition of cementing parameters through sensor devices, control of various processes through actuators and powertrain, and/or automation software which implements procedures that are able to execute a cementing job from a set of original instructions provided through a job schedule in an automated sequence. For example, a cementing system manager may use various automated sequences to coordinate lower level automation procedures for cement mixing, liquid additive mixing, batch mixing and pumping controls. In contrast, past cement mixing systems typically relied on commands from a human operator in order to perform such procedures or routines.

A cementing operation may include individual cementing procedures that may be executed until the cementing operation's completion. For example, cementing procedures may include pre-operation cementing procedures performed prior to generating and pumping of cement slurry. Cementing procedures may also include post-operation cementing procedures performed after pumping of cement slurry. For example, the last cementing procedure to be performed may be a washing procedure (also called "Wash Up"). A washing procedure may include washing down cement equipment to ensure a cementing system is functional for the next cementing operation. If not well performed, cement may be left on one or more components of the cementing system, which may block the lines in the cementing system. In some embodiments, a pre-operation cementing procedure or a post-operation cementing procedure is automated in a cementing system. In other embodiments, a cementing system's cementing procedures are automated from the pre-operation cementing procedures through the cementing process for a wellbore to the post-operation cementing procedures as well.

FIG. 1 shows example cementing operation at a wellsite 100. The wellsite 100 has a wellbore 102 extending into a subterranean formation 104 below a rig 105. The wellbore has casing 106 therein supported about the wellbore 102 by a wellhead 108. The wellhead 108 is coupled to a cementing (or active) system 111. The cementing system 111 includes a rig pump 110, a cement pump 112, and a cementing component 114.

The rig pump 110 and the cement pump 112 are fluidly coupled to the wellhead 108 to pass fluids therebetween. The rig pump 110 and the cement pump 112 are also fluidly coupled to a fluid source 116.1 and a cement source 116.2, respectively. The fluid source 116.1 may contain water, drilling fluids, mud, and/or other fluids that may be passed into the wellbore 102 as schematically shown. The cement source 116.2 may be, for example, a tank containing a mixture of cement and fluid that may be passed into the wellbore 102 as also schematically shown. The cementing system 111 may include various devices, such as valves 118, a blender 120, etc., to provide the fluid, the cement, and/or other materials as needed.

A cementing operation may be performed at the wellsite 100 based on a well plan and/or cement design that defines the process to be implemented at the wellsite 100. The rig pump 110 and the cement pump 112 may be fluidly coupled to the wellhead 108 by flowlines 119.1, 119.2. The pumps 110, 112 may be used to pump the fluid and cement in pumping sequences 122.1-122.7 according to the cement design as schematically shown. In the pumping sequences shown, drilling fluid (e.g., mud) 122.1 then water (e.g., wash/spacer) 122.2 from the rig pump 110 is initially pumped into the wellbore 102, followed by cement (e.g., slurries) 122.3, 122.4 from the cement pump 112, followed by water (e.g., wash/spacer) 122.5 from the rig pump 110, and then displacement fluid 122.6 from the rig pump 110, and another (optional) fluid 122.7 from the cement pump 112.

While a specific configuration of the cementing operation is shown, various sequences of various amounts of fluids from the fluid source 116.1, cement source 116.2 and/or other materials may be provided in various numbers of pumping sequences. Various fluids, such as washers, drilling fluids, cements, and/or spacers may be pumped using the rig pump 110, the cement pump 112, and/or other pumps (e.g., positive displacement pumps).

The pumping may be monitored and/or controlled, for example, to vary fluid flow via sensors (e.g., pressure gauges) at various locations, such as at the rig, pumps, the cement head, wellhead, etc. Fluid flow may be varied, for example, by controlling flow rates at the well inlet and exit, a surface pressure (e.g., at the pump and at the wellhead), fluids densities at the well inlet and/or exit, and/or tank volumes through the sensors located in the rig mud tanks.

The wellsite 100 may be provided with sensors (S) to measure wellsite parameters, such as pumping and/or cementing parameters (e.g., flow rate, composition, pressure, volume, temperature, etc.), density, equipment parameters (e.g., dimensions, specifications, client data, measurements, etc.), and/or other parameters as desired. The sensors (S) may be gauges or other measurement devices positioned about the oilfield (e.g., at the cementing component and/or rig equipment) to collect data (e.g., measurements) relating to the various operations. Various sensors (S) may be located at various positions along the cementing system 111 and/or the wellsite 100 to collect and/or monitor the desired data. For example, sensors (S) may be positioned at the wellhead 108, flowlines 119.1, 119.2, pumps 110, 112, etc.

The fluids from the rig pump 110 and the cement pump 112 may be pumped into the wellbore 102 to drive the cement from the cement source 116.2 into an annulus 123 between the casing 106 and the wall of the wellbore 102. The cement may be deployed into the wellbore 102 and positioned along the casing 106 to secure the casing 106 in the wellbore. The cement may also be positioned along the wellbore 102 (with or without the casing 106) to line and isolate the wellbore 102. The cement may provide zonal isolation along the wellbore 102 to prevent cementing defects, such as fluid invasion, and/or to prevent fracturing. The cement and/or fluids may be pumped in pumping sequences and/or have cementing parameters at given levels and/or limits to prevent cementing defects and/or to optimize the cementing operation.

As also schematically shown in FIG. 1, surface unit 124 may be provided at the wellsite 100 and/or an offsite (remote) location, such as an offsite facility 126.1 and/or a third party (e.g., client) facility 126.2. One or more of the surface units 124 may include the cementing component 114. The cementing component 114 may be integral with the surface unit 124 or coupled thereto for monitoring and/or performing cementing operations. The cementing operations may include, for example, opening and closing valves 118 to pass the fluids into the wellbore during the pumping sequences. The surface unit 124 and/or cementing component 114 may be manually and/or automatically operated by one or more on and/or offsite users.

The surface unit 124 and/or cementing component 114 may include various operating devices, such as a processor (e.g., CPU) 125.1, display 125.2, databases 125.3, controllers 125.4, power 125.5, communicators (e.g., transceivers) 125.6, electronics 125.7, and/or other devices, to perform the cementing operations. The database 125.3 may be communicatively coupled via the transceiver 125.6 to the sensors (S) to receive and/or store the measurements. The processor 125.1 may be used generate the images for the display 125.2. The display 125.2 may include and/or be coupled to input/output devices 125.8, such as a mouse, keyboard, printer, monitor, etc.

The surface unit(s) 124 and/or cementing component 114 may be communicatively coupled via communication links 128 to one or more on and/or offsite locations. As schematically shown, communication links 128 may be established between various portions of the cementing system 111. The communication links 128 may be used to pass power, communication, control, and/or other signals for selectively performing cementing and/or other wellsite operations. Various on/offsite equipment may be connected via the communication links for communication between various users, such as operators and/or clients. Data having various formats, such as wellsite information transfer standard markup language (WITSML), may be communicated among the users.

Figure 2:
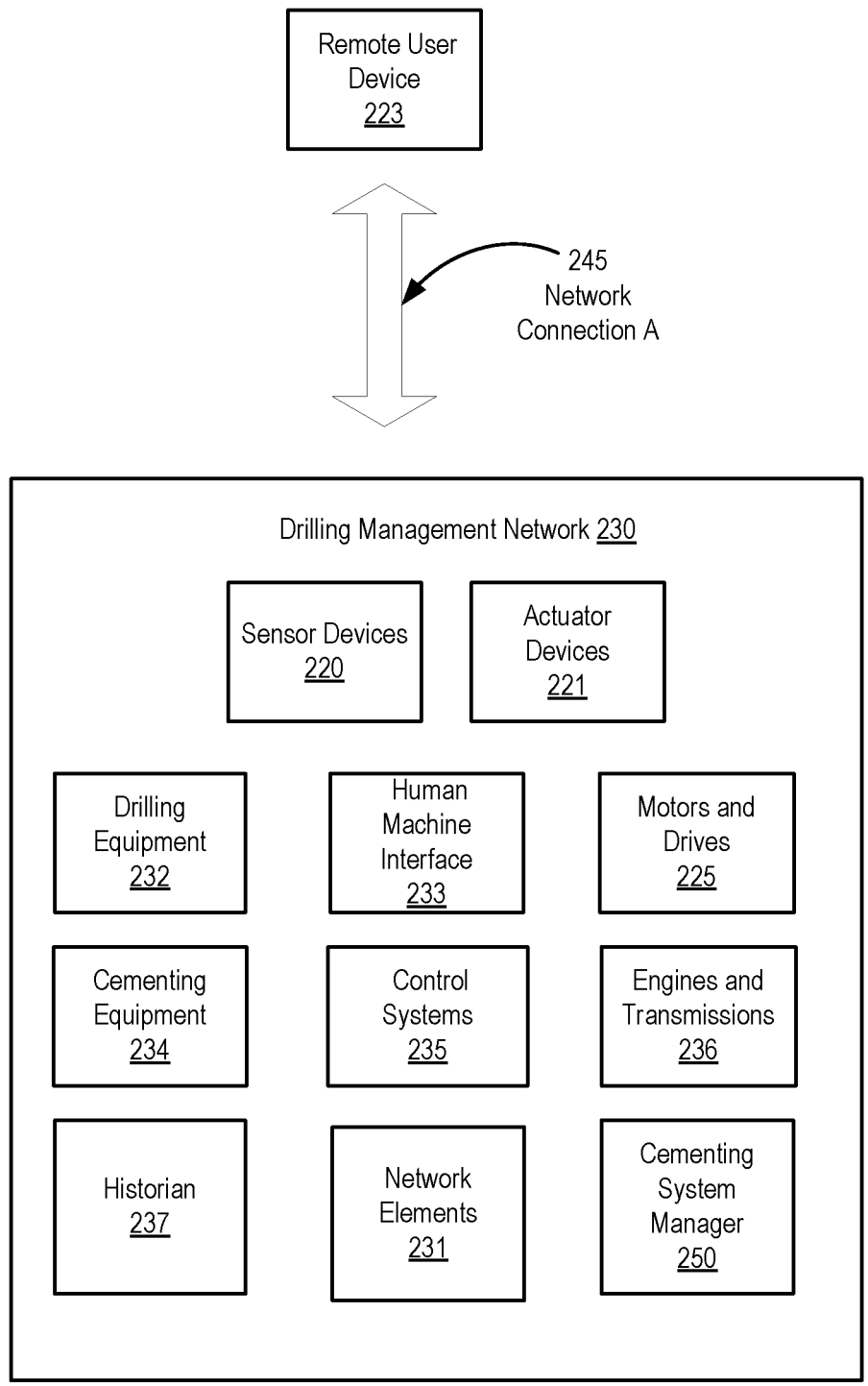

Turning to FIG. 2, FIG. 2 shows a block diagram of a system in accordance with one or more embodiments. As shown in FIG. 2, a drilling management network (230) may include various sensor devices (e.g., sensor devices (220)), actuator devices (e.g., actuator devices (221)), a human machine interface (HMI) (e.g., HMI (233)), a historian (e.g., historian (237)), and various network elements (e.g., network elements (231)). In some embodiments, a drilling management network may be a management network with one or more control systems proximate a drilling rig site. Sensor devices may include hardware and/or software that includes functionality to obtain one or more sensor measurements, e.g., a sensor measurement of an environment condition proximate the sensor devices (220). A sensor device may process the sensor measurements into various types of sensor data. For example, a sensor device may include functionality to convert sensor measurements obtained from sensor data into a communication protocol format for transmission through the drilling management network (230).

The sensor devices may include flowmeters, such as magnetic and Coriolis flowmeters, pressure sensors, temperature sensors, pumping rate sensors and densitometers pressure sensors, torque sensors, rotary switches, weight sensors, position sensors, microswitches, etc. The sensor devices may also include smart sensors. For example, a sensor device may be coupled with a computer device that transmits sensor data over a drilling management network using a communication interface. Actuator devices may include, for example, solenoid valves and various digital output devices that control fixed speed motors, start and stop times for cooling, lubrication, hydraulics, centrifugal pumps, valve actuation, and/or agitators.

In one or more embodiments, a drilling management network includes a cementing system manager (e.g., cementing system manager (250)). In particular, a cementing system manager may include hardware and/or software that includes functionality for controlling one or more cementing procedures performed by cementing equipment (e.g., cementing equipment (234)) and/or a cementing system (e.g., cementing system (400) shown in FIGS. 4.1 and 4.2 below). For example, the cementing system manager may include, for example, one or more programmable logic controllers (PLCs) that include hardware and/or software with functionality to control one or more processes performed by cementing equipment, including, but not limited to the components described below in FIGS. 4.1 and 4.2. Specifically, a programmable logic controller may control valve states, fluid levels, pipe pressures, warning alarms, and/or pressure releases throughout a drilling rig. Moreover, a programmable logic controller may be a ruggedized computer system with functionality to withstand vibrations, extreme temperatures, wet conditions, and/or dusty conditions, for example, around a drilling rig and/or cementing system.

Turning to FIG. 4.1, FIG. 4.1 shows a block diagram of a system in accordance with one or more embodiments. As shown in FIG. 4.1, a cementing system (400) may include cementing equipment that includes functionality for performing one or more cementing procedures. Specifically, cementing equipment may include various fluid containers (e.g., displacement tank A (421), displacement tank B (422)), pumps (e.g., pump A (461), pump B (462), pump X (463), pump Y (464), slurry pump (491)), valves (e.g., shut-off valve A (431), slurry recirculation valve A (432), pump valve A (433), pump valve B (434), suction valve (435), thin-up valve (436), jet line valve (437), displacement tank valves (438), water supply valve (439)), and fluid sources (e.g., water supply (450), cement source (410)). Cementing equipment may also include various piping arrangements (e.g., jet lines (460), thin-up lines (470)) for combining various substances in a mixing system (e.g., mixing bowl, mixing tank (420)) to produce a cement slurry. Moreover, cementing equipment may also include hardware that includes functionality for sealing in a casing (e.g., well casing (493)) in a wellbore (e.g., slurry pump (491), cement head (492)). Cementing equipment may be divided in two main technologies, i.e., local control units, where equipment operators control the cementing equipment locally on the drilling site, or remote control units, where the cementing equipment is operated from an HMI.

Turning to FIG. 4.2, FIG. 4.2 shows a block diagram of a system in accordance with one or more embodiments. As shown in FIG. 4.2, a cementing system (400) may include a liquid additive system (e.g., liquid additive system (401)), a cement pumping skid (e.g., cement pumping skid (402)), and a batch mixing system (e.g., batch mixing system (403)). In particular, a cement pumping skid may obtain chemicals from a liquid additive system. Moreover, the cement pumping skid may transfer cement slurry from a batch mixing system. Once the cement slurry is prepared, the cement pumping skid may transfer the cement slurry down a wellbore, e.g., using a slurry pump. A liquid additive system and a batch mixing system may have pumps similar to the pumps described above in FIG. 1 that are primed prior to a particular cementing procedure. Similarly, cementing equipment in the liquid additive system may undergo one or more washing procedures after a particular cementing procedure for removal of chemicals. A washing procedure in the batch mixing system may remove cement, e.g., if the batching mixing system is used for a batch mixing cement job. While examples of cementing equipment are shown in FIGS. 4.1 and 4.2, other types and configurations of cementing equipment are contemplated which are not illustrated in FIGS. 4.1 and 4.2.

In some embodiments, a cementing system may include various sensor devices (e.g., sensor device M (451)), sensor device N (452), sensor device O (453)) and/or various actuators (e.g., actuator A (441), actuator B (442)) that may include functionality for monitoring and/or controlling cementing equipment throughout the cementing system. While only a few sensor devices and actuators are shown in FIG. 4.1, it should be understood that more actuators and sensor device may be coupled to various components throughout the cementing system (400).

Further, a cementing system may include cement mixing equipment (e.g., mixing tank (420), mixing bowl (415)) to perform various cementing operations. In particular, the cementing system (400) may fill a casing formation annulus with high quality cement, which may determine the operational life of a wellbore. As such, a satisfactory cementing operation may ensure both production and safety. On the other hand, a poor cementing operation may result in the production of fluids channeling through a faulty cement sheath, which may jeopardize production strategy and compromise safety. Therefore, a cementing system may address such problems by automating one or more cementing procedures relating to cement mixing.

In some embodiments, a drilling management network and/or cementing system is installed onboard offshore drilling rigs. Here, a cementing operation may include preparing, mixing and pumping cement into a wellbore, mainly for supporting and protecting well casings and achieving zonal isolation. The cementing equipment used for offshore operations may also be divided in two categories: local and remote control. The standard local control cementing equipment package may include a batch mixer, a mixing system, liquid additive system and the cement pumping equipment.

Prior to a cementing operation for filling a wellbore, various high-pressure pumps may undergo a pre-operation procedure called priming. Priming may ensure that air particles are removed from one or more pumps to prevent cavitation from occurring and thus damage a respective pump. In one or more embodiments, a cementing system automates the process of priming a pump using a control system and a cementing procedure. For example, a cementing system manager may cause a pump to circulate water and diagnose at which point air particles are removed from the pump using signal processing analysis of sensor data, such as pressure data. Once the cementing system manager determines that a pump is diagnosed to be ready, the cementing system then ends the priming procedure.

After cementing a wellbore, a cementing system may perform a washing procedure. A washing procedure may ensure that cement slurry and cement chemicals are removed from piping, valves, sensors, tubs, tanks, and any other areas in the cementing system that may have been exposed during a cementing operation. Washing procedure may be performed by circulating water through cementing equipment in such a way that equipment exposed to cement and cement chemicals are then circulated through water at a predetermined rate and for a predetermined period of time. The cementing system may use densitometers and flowmeters for measuring the fluctuations in density, flowrate, and viscosity of the wash-up fluids until a point is reached that satisfies the cementing system manager. For example, the cementing system manager may analyze sensor data to determine if cementing equipment is clean and the washing procedure can conclude by draining the wash-up fluids. If a washing procedure is not well performed, cement residues from the cementing operation may be left on pipe, settling down, and thereby blocking pipes with hard cement.

Further, a cementing system may include various interconnected components for performing various cementing procedures for preparation, maintenance, and/or actual cementing operations, such as with respect to a drilling operation. Likewise, a cementing system may be part of a drilling management network as shown in FIG. 2, or a separate system from a drilling management network. Thus, a cementing system may include various network devices, such as network elements, cables, etc., with functionality for transmitting and/or receiving data, such as sensor data and commands, throughout the cementing system.

Returning to FIG. 2, in one or more embodiments, the drilling management network (230) may optionally include drilling equipment (e.g., drilling equipment (232)) such as draw works, top drive, mud pumps and other components described above in FIG. 1 and the accompanying description). In some embodiments, for example, the drilling management network may control cementing operations without controlling drilling operations. More specifically, a drilling management network (230) may include diesel cementing systems and/or electric cementing systems. For example, the drilling management network (230) may further include various engines (e.g., engines and transmissions (236)), for example, as the primary mover of pumps in a cementing system. Engines and transmissions may include hardware and/or software for converting fuel into electric energy for operating drilling equipment and/or cementing equipment. For example, an engine may be a diesel engine-generator. The drilling management network (230) may further include electric motors and adjustable/variable frequency drives (e.g., motors and drives (225)) for powering cementing equipment.

Moreover, the drilling management network (230) may further include various control systems (e.g., control systems (235)) for drilling operations, maintenance operations, and/or cementing operations. Control systems may include, for example, programmable logic controllers with functionality to control one or more processes performed by performed by the drilling equipment (232) and/or cementing equipment (234), including, but not limited to the components described in FIGS. 1, 4.1 and 4.2. Without loss of generality, the term "control system" may refer to a drilling operation control system or cementing procedure control system that is used to operate and control the equipment, a data acquisition and monitoring system that is used to acquire process and equipment data and to monitor the operation of the drilling process and/or cementing process, or an interpretation software system that is used to analyze and understand events and progress.

Keeping with FIG. 2, drilling operation control systems, cementing procedure control system, and/or maintenance control systems may refer to control systems that include multiple PLCs within the drilling management network (230). For example, a control system may include functionality to control operations within a system, assembly, and/or subassembly described above in FIGS. 1, 4.1, and 4.2, and the accompanying description. As such, one or more of the control systems (235) may include functionality to monitor and/or perform various cementing processes performed by the cementing equipment (234) with respect to the mud circulation system, the rotating system, the hoisting system, a pipe handling system, and/or various other drilling activities described with respect to FIGS. 1, 4.1, and 4.2, and the accompanying description.

In one or more embodiments, a drilling management network may include a human machine interface (e.g., human machine interface (233)) which may be hardware and/or software coupled to the drilling management network. For example, the HMI (233) may allow the operator to interact with PLCs and/or the cementing system manager in the drilling system, e.g., to send a command to operate an equipment, or to view sensor information from cementing equipment. The human machine interface may include functionality for presenting data and/or receiving inputs from a user regarding various drilling operations and/or cementing operations. Thus, a user at a remote user device may be able to control and monitor one or more control systems without being proximate to the drilling management network or the HMI. For example, a human machine interface may include software to provide a graphical user interface (GUI) for presenting data and/or receiving control commands for operating a drilling rig and/or cementing system.

In some embodiments, a remote user device (e.g., remote user device (223)) may connect to a drilling management network over a remote connection (e.g., network connection A (245)). The user devices may include hardware and/or software coupled to the drilling management network (230), and which includes functionality for presenting data and/or receiving inputs from a user regarding various drilling operations and/or maintenance operations performed within the drilling management network (230). For example, a user device may include personal computers, smartphones, human machine interfaces, and any other devices coupled to a network that obtain inputs from one or more users, e.g., by providing a graphical user interface (GUI). Likewise, a user device may present data and/or receive control commands from a user for operating a drilling rig and/or cementing system. A network element (e.g., network elements (231)) may refer to various hardware components within a network, such as switches, routers, hubs or any other logical entities for uniting one or more physical devices on the network. In particular, a network element, the human machine interface, and/or the historian may be a computing system similar to the computing system (700) described in FIGS. 7.1 and 7.2, and the accompanying description.

While FIGS. 1, 2, 4.1, and 4.2 show various configurations of components, other configurations may be used without departing from the scope of the disclosure. For example, various components in FIGS. 1, 2, 4.1, and 4.2 may be combined to create a single component. As another example, the functionality performed by a single component may be performed by two or more components.

Figure 3:
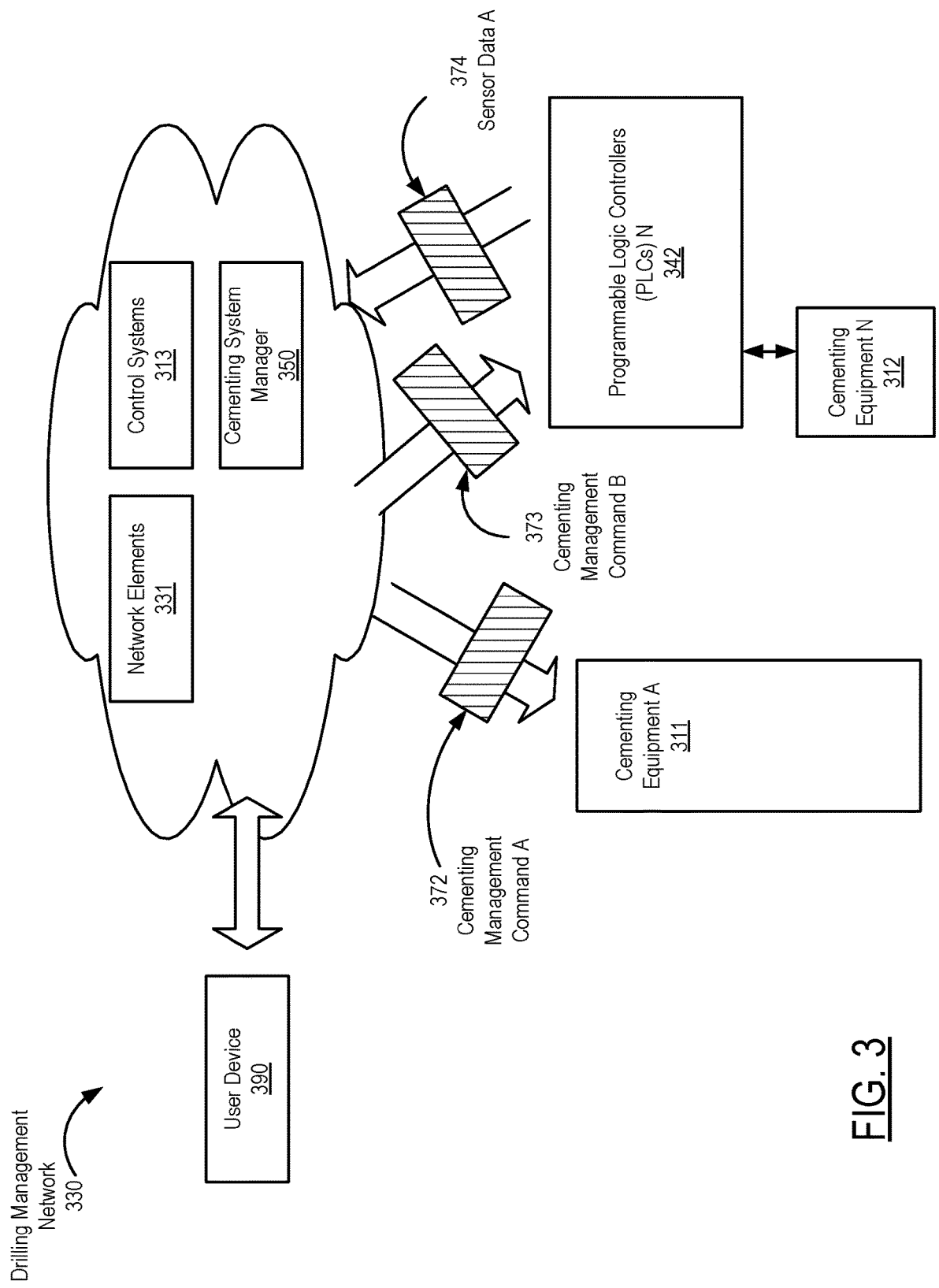

Turning to FIG. 3, FIG. 3 shows a block diagram of a system in accordance with one or more embodiments. As shown in FIG. 3, a drilling management network (330) may include various user devices (e.g., user device (390)), various network elements (e.g., network elements (331)), a cementing system manager (e.g., cementing system manager (350)), various control systems (e.g., control systems (313)), cementing equipment (e.g., cementing equipment A (311), cementing equipment N (312)), and programmable logic controllers (e.g., PLCs N (342)). Accordingly, one or more devices and/or systems on the drilling management network (330) may transmit data packets, e.g., sensor data (e.g., sensor data A (374), to the user device (390) and/or receive data packets from the PLCs N regarding operation information of cementing equipment and other devices. For example, sensor data may be sent over the drilling management network (330) to the cementing system manager (350) using a communication protocol.

In one or more embodiments, a cementing system manager transmits cementing management commands (e.g., cementing management command A (372), cementing management command B (373)) to cementing equipment and/or programmable logic controllers to manage cementing procedures throughout a drilling management network and/or cementing system. For example, if an automated sequence is being performed by cementing equipment, the cementing system manager may transmit cementing management commands to start different procedures after each procedure ends in the automated sequence. Likewise, if the cementing system manager detects a problem during performance of a cementing procedure, cementing management commands may be used to terminate the cementing procedure prematurely or adjust equipment parameters to address the problem.

Figure 5:
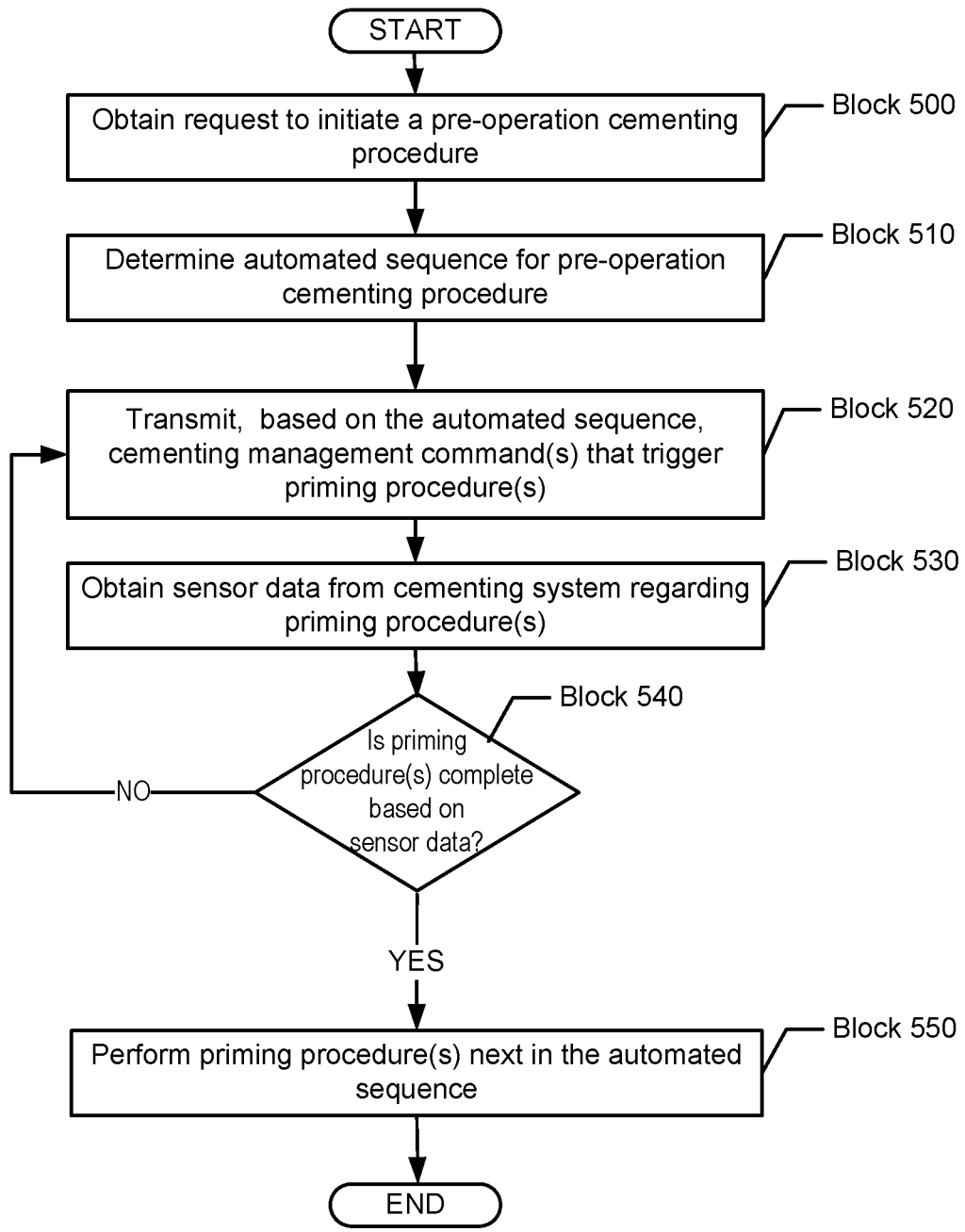
FIGS. 5 and 6 show flowcharts in accordance with one or more embodiments FIGS. 7.1 and 7.2 show a computing system in accordance with one or more embodiments.

Turning to FIG. 5, FIG. 5 shows a flowchart in accordance with one or more embodiments. Specifically, FIG. 5 describes a general method for automating a pre-operation cementing procedure. One or more blocks in FIG. 5 may be performed by one or more components (e.g., cementing system manager (250)) as described in FIGS. 1, 2, 3, 4.1, and/or 4.2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a request is obtained to implement a pre-operation cementing procedure in accordance with one or more embodiments. For example, a user device may obtain a single input from a user to initiate a series of predetermined cementing procedures to complete a particular job. In other words, the request may correspond to "one button cementing" in contrast to techniques where a human user manages individual tasks and various operations within an individual cementing procedure. In some embodiments, the request corresponds to a scheduled day and time when to begin the pre-operation cementing procedure. Likewise, the pre-operation cementing procedure may begin as soon as the request is received.

In some embodiments, the request is transmitted automatically by a device within a drilling management network or cementing system based on sensor data. For example, if a cementing system manager determines that a scheduled cementing procedure for a wellbore occurs at a particular time, the cementing system manager may trigger the request in preparation of the scheduled cementing procedure.

In Block 510, an automated sequence is determined for a pre-operation cementing procedure in accordance with one or more embodiments. For example, an automated sequence may include a predetermined order of events in a cementing system to perform one or more cementing procedures along with the corresponding operation parameters of the cementing equipment. For example, a human machine interface may include various prestored automated sequences for different cementing procedures. Furthermore, an automated sequence may be divided into multiple stages. For example, stage 1 of an automated sequence may have a recipe name and a stage volume that involves multiple batches. Stage 2 of the automated sequence may also have a particular stage volume, and this may be repeated to stage n, respectively.

For example, a human operator may determine various automated sequences in advance and a user may select a particular automated sequence among the provided automated sequences with a user device. In one or more embodiments, a cementing system manager may determine the automated sequence based on previous user requests and/or sensor data. For example, a cementing system manager may perform one or more artificial intelligence algorithms in order to modify and/or generate a new automated sequence.

In one or more embodiments, one or more predetermined parameters are selected for an automated sequence by a user device and/or a cementing system manager. For example, a user may provide parameters in an automated sequence for mix fluid control, such that mix fluid volume=base fluid volume+liquid additives volumes. In particular, the user may select whether the base fluid is sea water, brine, or mud, as well as parameters corresponding to different fluid concentrations and total fluid volumes. Likewise, an automated sequence may also define different times and thresholds when different stages need to occur prior to a cementing system moving to the next stage.

In Block 520, one or more cementing management commands are transmitted based on an automated sequence to trigger one or more priming procedures in accordance with one or more embodiments. Using cementing management commands, for example, the cementing system manager may coordinate the start and stop times of various cementing equipment for implementing an automated sequence one or more priming procedures. For example, a cementing management command may be a control signal used to operate an actuator to adjust cementing equipment settings. Likewise, a cementing management command may be transmitted to a PLC or control system to change one or more settings in a cementing system. Thus, a cementing management command may be an analog signal or a digital data message implemented by cementing equipment.

With regard to a priming procedure, an automated sequence may include a cementing procedure for priming one or more pumps in a cementing system. During the priming procedure, a cementing system manager may obtain sensor data regarding a respective pump to determine whether air is present in the respective pump. Once the cementing system manager determines that air is no longer present, the cementing system manager may determine that the cementing procedure is complete. The goal of priming may be to remove trapped air from the components and lines in the cementing system. Generally, priming may involve pumping water from one displacement tank through the suction lines, pumps, high-pressure manifold and discharge line, and back to the other displacement tank.

Moreover, an example of an automated sequence may include one procedure for priming one pump, another procedure for priming a different pump, and a third procedure for priming a mixing system in the cementing system. In some priming procedures, a low-pressure pressurizing pump is primed followed by priming a high-pressure triplex pump. Afterwards, a mixing system is primed accordingly.

In another priming procedure, various displacement tanks in a cementing system are filled with water. To fill a displacement tank with water, discharge valves are closed on the tanks. Afterwards, a tank may be selected using a tank selector valve. Then, a water supply valve may be opened to allow water to enter the selected displacement tank. When the displacement tank is full, the water supply valve may be closed to avoid overflow. Another displacement tank may be selected and filled using the same procedure. Next in the priming procedure, a pump may be engaged accordingly. While filling the displacement tanks with water, a front engine may be verified as not running. If the front engine is running, a cementing system manager may shut it down. Then, a front pressurizing pump may be engaged accordingly. The front engine is stopped before you engage the pump. Afterwards, the front engine in the cementing system may be restarted. Subsequently, water may be pumped through a front triplex pump and pumping may occur through the front engine powering the pressurizing pump. Moreover, throttling may occur with the front engine to increase the pump's speed. Afterwards, water may be pumped through the front triplex pump and back to a displacement tank. Finally, the cementing system manager may verify that valve settings are correct. While only a few aspects of a priming procedure are described, other combinations of processes of priming procedures are contemplated.

Keeping with Block 520, another example of an automated sequence includes one priming procedure for closing various valves in a cementing system. The automated sequence may include another priming procedure that opens a water supply valve to allow water to enter a displacement tank in the cementing system. The automated sequence may further include another procedure for closing the water supply valve.

In one or more embodiments, a cementing management command is used by a cementing system manager to communicate with the firmware operating on a particular cementing equipment. For example, the command may cause the firmware to open a selected base fluid valve. The command may also include information controlling the percentage that the valve will open until a predetermine volume threshold is met. Other cementing management commands may control liquid additives at the same time until various thresholds are met. Other commands may trigger a PLC, for example, to provide a status update back to a user device or a cementing system manager on the cementing equipment or cementing procedure. Accordingly, the cementing system manager may display on an HMI that the automated sequence execution is complete.

In Block 530, sensor data is obtained from cementing system regarding one or more priming procedures in accordance with one or more embodiments. For example, a cementing system manager may collect sensor data from sensor devices coupled to cementing equipment throughout a cementing system. Moreover, the sensor device may be similar to the sensor devices described in FIGS. 2, 3, 4.1, and 4.2, and the accompanying description. In one or more embodiments, the sensor device connects directly to a cementing system manager.

In Block 540, a determination is made whether one or more priming procedures are complete based on sensor data in accordance with one or more embodiments. Using sensor data and information collected from cementing equipment and PLCs throughout a cementing system, a user device or a cementing system manager may determine whether a particular priming procedure is complete. For example, sensor data may be compared to a predetermined threshold to identify whether a priming procedure is finished. When a determination is made that the priming procedures at the current stage of the automated sequence are complete, the process may proceed to Block 550. When a determination is made that one or more priming procedures are unfinished at the current stage in the automated sequence, the process proceeds to Block 520.

In Block 550, one or more priming procedures are performed next in an automated sequence in accordance with one or more embodiments. In some embodiments, the cementing system manager identifies the next cementing procedure in an automated sequence and initiates that cementing procedure accordingly.

While priming procedures are described above with respect to FIG. 5, other pre-operation cementing procedures are contemplated. For example, pressurizing tests for pumps and various maintenance cementing procedures may also be performed using a similar framework.

Figure 6:
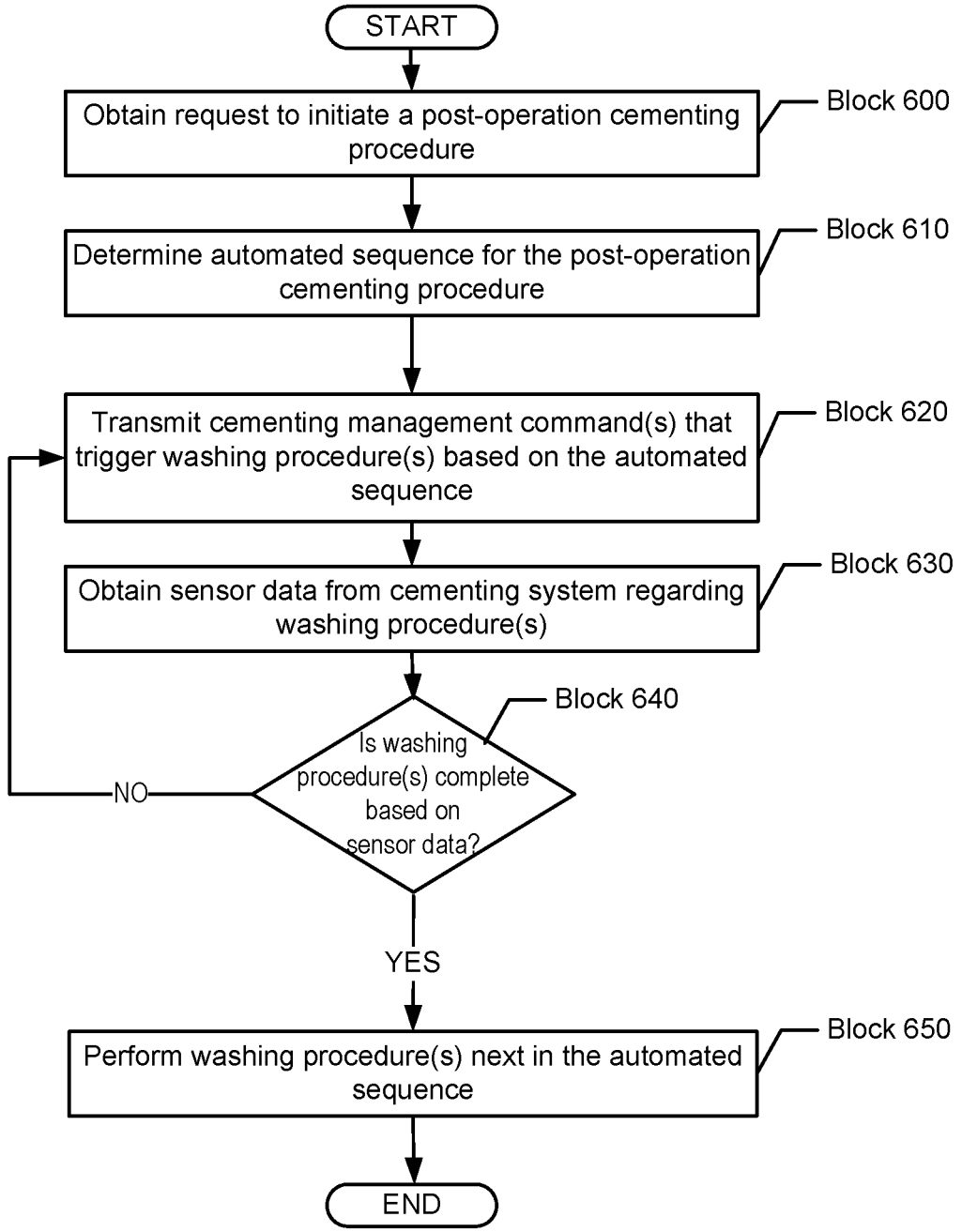

Turning to FIG. 6, FIG. 6 shows a flowchart in accordance with one or more embodiments. Specifically, FIG. 6 describes a general method for automating a post-operation cementing procedure. One or more blocks in FIG. 6 may be performed by one or more components (e.g., cementing system manager (250)) as described in FIGS. 1, 2, 3, 4.1, and/or 4.2. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, a request is obtained to initiate a post-operation cementing procedure in accordance with one or more embodiments. The request in Block 600 may be similar to the request described in Block 500 above. For example, the post-operation cementing procedure may be a washing procedure (also called "Wash up"), where clean water is supplied to a displacement tank, which supplies water to a recirculation centrifugal pump. This pump may supply water to the mixing tank and recirculate enough time to ensure the mixing system is clean after that the dirty water is dumped though rig drain. The recirculation centrifugal pump may also supply water to the triplex pumps and high pressure pipes for cleaning those lines. Also, the clean water supplied by the displacement tank is pumped by injection centrifugal pumps to clean jet and thin-up lines.

In Block 610, an automated sequence is determined for a post-operation cementing procedure in accordance with one or more embodiments. The automated sequence in Block 610 may be similar to the automated sequence described in Block 510 above.

In Block 620, one or more cementing management commands are transmitted, based on an automated sequence, that trigger one or more washing procedures in accordance with one or more embodiments. The cementing management commands in Block 620 may be similar to the cementing management commands described above in FIG. 3 and in Block 520 of FIG. 5.

Moreover, an example of an automated sequence for a washing procedure may include a pre-washup procedure that pumps water through various lines in a cementing system, a mixing line procedure that recirculates water through a mixing system using a recirculation centrifugal pump, a high pressure line procedure that supplies water to various high pressure pumps and high pressure pipes in the cementing system. The automated sequence may further include a jet and thin-up lines procedure that supplies water to a mixing tank through jet lines and thin-up lines. Thus, a cementing system manager may execute the automated sequence for the washing procedure to perform the post-operation cementing procedure.

More specifically, the pre-washup procedure is responsible for washing down the lines in the cementing system, removing heavy cement slurry and residues left on pipes. The mixing lines procedure is used for cleaning the mixing system, recirculating water using a recirculation centrifugal pump and measuring the density using the densitometer installed on the mixing tank. On the high pressure lines procedure, the recirculation centrifugal pump may supply clean water to the high pressure pumps and high pressure pipes pushing cement residues to a drain. On the jet and thin-up lines procedure, an injection centrifugal pump may supply clean water to a mix tank through the jet and thin-up lines, the additives lines, and other lines in the cementing system.

In Block 630, sensor data is obtained from a cementing system regarding one or more washing procedures in accordance with one or more embodiments. For example, the sensor data may be obtained from a sensor device coupled to cementing equipment. Likewise, the sensor device may be similar to the sensor devices described in FIGS. 2, 3, and 4.1, and the accompanying description. In one or more embodiments, the sensor device connects directly to a cementing system manager.

In Block 640, a determination is made whether one or more washing procedures are complete based on sensor data in accordance with one or more embodiments. For example, a cementing system manager may analyze sensor data to verify whether a washing procedure satisfies a predetermine threshold or other criterion. When a determination is made that the washing procedures at the current stage of the automated sequence are complete, the process may proceed to Block 650. When a determination is made that one or more washing procedures are unfinished at the current stage in the automated sequence, the process proceeds to Block 620.

In Block 650, one or more washing procedures are performed next in an automated sequence in accordance with one or more embodiments. In some embodiments, the cementing system manager identifies the next cementing procedure in an automated sequence and initiates that cementing procedure accordingly.

While washing procedures are described above with respect to FIG. 6, other post-operation cementing procedures are contemplated. For example, various maintenance cementing procedures may also be performed using a similar framework.

Embodiments may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (727). For example, the nodes may be part of a cloud computing system. The nodes may include functionality to receive requests from the client device ((727) and transmit responses to the client device ((727). The client device ((727) may be a computing system, such as the computing system shown in FIG. 7.1. Further, the client device ((727) may include and/or perform all or a portion of one or more embodiments of the disclosure.

The computing system or group of computing systems described in FIGS. 7.1 and 7.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (700) in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the disclosure, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, by a computer processor, a request to initiate a pre-operation cementing procedure;
   determining, by the computer processor, an automated sequence for the pre-operation cementing procedure, wherein the automated sequence corresponds to a plurality of priming procedures for a cementing system;
   transmitting, by the computer processor and based on the automated sequence, a cementing management command that triggers at least one priming procedure among the plurality of priming procedures for cementing equipment in the cementing system;
   obtaining, by the computer processor, first sensor data regarding the cementing equipment; and
   determining, by the computer processor and in response to the first sensor data, whether to perform a next priming procedure in the automated sequence.

2. The method of claim 1, further comprising:
   performing the at least one priming procedure for a pump coupled to a displacement tank within the cementing system;
   determining, from second sensor data regarding the displacement tank, that air is no longer present in the pump; and
   determining, in response to the air being not present in the pump, that the at least one priming procedure is complete.

3. The method of claim 1, further comprising:
   obtaining, from a human machine interface (HMI), a selection of the automated sequence from a plurality of automated sequences for the cementing system.

4. The method of claim 1,
   wherein the plurality of priming procedures are followed by an automated cementing procedure where cement slurry is pumped into a wellbore.

5. The method of claim 1,
   wherein the request is obtained from a cementing system manager in a drilling management network in response to a scheduled cementing procedure, and
   wherein the cementing system manager comprises a programmable logic controller (PLC).

6. The method of claim 1,
   wherein the automated sequence comprises:
   priming a first pump in the cementing system,
   priming a second pump in the cementing system, and
   priming a mixing system in the cementing system, and
   wherein the at least one priming procedure corresponds to priming the first pump.

7. The method of claim 1,
   wherein the automated sequence comprises:
   closing a plurality of valves in the cementing system, and
   opening a water supply valve to allow water to enter a displacement tank in the cementing system, and
   closing the water supply valve, and
   wherein the at least one priming procedure corresponds to opening the water supply valve.

8. The method of claim 1,
   wherein the sensor data is water pressure data that is detected by a flow meter coupled to a jet line in the cementing system.

9. The method of claim 1,
   wherein the cementing system comprises:
   a cement source;
   a mixing bowl coupled to the cement source;
   a mixing tank coupled to the mixing bowl, wherein the mixing tank is configured to store cement slurry; and
   a slurry pump coupled to the mixing tank, wherein the slurry pump is configured to pump the cement slurry to a cement head coupled to a wellbore.

10. A method, comprising:
    obtaining, by a computer processor, a request to initiate a post-operation cementing procedure;
    determining, by the computer processor, an automated sequence for the post-operation cementing procedure, wherein the automated sequence corresponds to a plurality of washing procedures for a cementing system;
    transmitting, by the computer processor and based on the automated sequence, a cementing management command that triggers at least one washing procedure among the plurality of washing procedures for cementing equipment in the cementing system;
    obtaining sensor data regarding the cementing equipment in the cementing system; and
    determining, in response to the sensor data, whether to perform a next washing procedure in the automated sequence.

11. The method of claim 10,
    wherein the request is triggered in response to completion of a cementing procedure where cement slurry is pumped into a wellbore.

12. The method of claim 10, further comprising:
performing a washing procedure for a jet line and a thin-up line within the cementing system;
determining, from second sensor data regarding the jet line and the thin-up line, that cement slurry and residue is removed from the jet line and the thin-up line; and
determining, in response to the cement slurry and the residue being removed from the jet line and the thin-up line, that the washing procedure is complete.

13. The method of claim 10, further comprising:
obtaining, from a human machine interface (HMI), a selection of the automated sequence from a plurality of automated sequences for the cementing system.

14. The method of claim 10,
wherein the request is obtained from a cementing system manager in a drilling management network in response to a scheduled cementing procedure, and
wherein the cementing system manager comprises a programmable logic controller (PLC).

15. The method of claim 10,
wherein the automated sequence comprises:
a pre-washup procedure that pumps water through a plurality of lines in the cementing system,
a mixing line procedure that recirculates first water through a mixing system using a pump,
a high pressure lines procedure that supplies second water to a plurality of pumps and a plurality of pipes, and
a jet and thin-up lines procedure that supplies third water to a mixing tank through jet lines and thin-up lines, and
wherein the at least one washing procedure corresponds to the pre-washup procedure.

16. The method of claim 10,
wherein the sensor data is water pressure data that is detected by a flow meter coupled to a jet line in the cementing system.

17. The method of claim 10,
wherein the cementing system comprises:
a cement source;
a mixing bowl coupled to the cement source;
a mixing tank coupled to the mixing bowl, wherein the mixing tank is configured to store cement slurry; and
a slurry pump coupled to the mixing tank, wherein the slurry pump is configured to pump the cement slurry to a cement head coupled to a wellbore.

* * * * *